June 12, 1934. E. W. O'MALLEY 1,962,520

VALVE SEAT

Filed Dec. 28, 1933

INVENTOR
EDWARD W. O'MALLEY
BY Langan Mum
ATTY.

Patented June 12, 1934

1,962,520

UNITED STATES PATENT OFFICE 1,962,520

VALVE SEAT

Edward W. O'Malley, Chicago, Ill.

Application December 28, 1933, Serial No. 704,237

1 Claim. (Cl. 251—167)

This invention relates to improvements in valve structures and more particularly to the construction of seats for valves of the type generally known as globe valves.

The invention is of particular utility in connection with valves for railroad locomotives, in which service new and more severe requirements are constantly being imposed upon valve structures. Whereas, a few years ago the average run of a locomotive was only one hundred miles, present day engines are being built to make a continuous run of five hundred or even a thousand miles. The steam pressures have also been increased and even doubled. Consequently, a high degree of durability, efficiency and facility for quick repair is more desirable than ever before, in valves for this service. This invention may be applied to valves of all types employing a reciprocating head coacting with a circular seat. Practical experience has taught that to obtain the best results the angle of the mating surfaces of head and seat varies in accordance with the service for which the valve is designed. This invention contemplates the provision of a valve seat which will coact efficiently under all conditions.

Valve structures with removable wearing surfaces have been well known hitherto, but these have been objectionable since, when one of the mating surfaces has been deteriorated, the other is usually deteriorated also, and to restore the valve structure to perfect condition, both of these surfaces should be replaced. Even where this is possible and expected, it is difficult to get the ordinary workmen to do it. They can be readily taught to replace one of the surfaces but not both of them. This being the case it may be said that the seat is the heart of the valve as its usefulness depends upon the durability and duration of efficient cooperation of the seat with the mating surface of the head.

Among other objects, the present invention aims to provide an improved and economical valve structure in which the valve seat may be formed from metals that in nature possess extreme hardness, or which may be subjected to processes to acquire such quality, such as bronze, nickel alloys, stainless steels, nitrided nitralloy, whereby the seat may be formed by casting or manufactured from rod stock, so that the seat will not be affected by the usual causes which effect deterioration of conventional valve seats.

This multifaced valve seat is of particular advantage to valve manufacturers providing valves for various services, as well as to large users of valves, such as railroads using to a great extent multiplate valves in which both head and seat are provided with a multiplicity of removable mating surface plates, and in which this improved seat is readily substituted.

Other objects and advantages will be apparent from the following description, taken together with the accompanying drawing showing an illustrative embodiment of the invention, in which—

Figure 1:
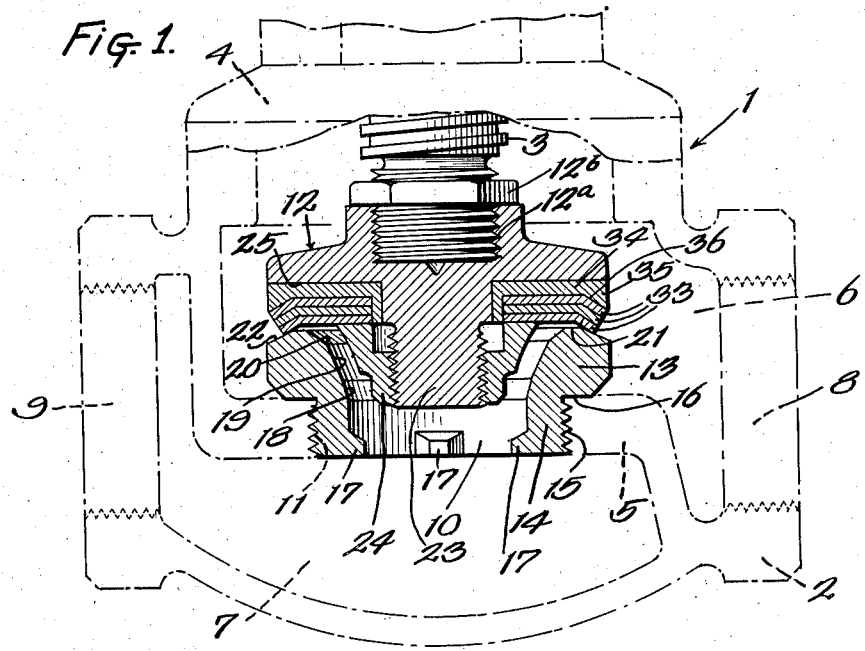
Figure 1 is a longitudinal view, partly in section and partly in elevation, illustrating an application of this invention to a particular type of valve structure, a conventional portion of which is shown in broken lines.

In the illustrative embodiment, I have shown, in general, a portion of a valve structure 1 having the usual casing 2, shown in broken lines, and which may include suitable operating mechanism, such as a hand-wheel or the like (not shown) appropriately connected with the threaded valve stem 3. As is well known in the art, the valve stem 3 may pass threadedly through a bonnet 4, also shown in broken lines, which may be detached from the casing 2 to afford access to the interior of the casing. By rotation of the valve stem in the bonnet 4, the stem may be reciprocated.

In this instance the casing 2, being for what is commonly known as a globe valve, is provided centrally thereof with an integral web 5 which divides the casing into two chambers 6 and 7, served respectively by ports 8 and 9, one of which may be the inlet and the other the outlet port for the valve structure.

The web 5 has a fluid passage 10 therethrough formed by a central aperture 11 in the web and this aperture is adapted to be closed by the valve 12 when the valve is moved into the passage 10 by the valve stem 3, as explained. The valve 12 is imperforate, but may have an interiorly threaded socket portion 12a into which the valve stem 3 is screwed to connect the valve and stem together. A lock nut 12b may assist in maintaining a secure and rigid connection between the valve and the stem.

A multiface valve seat 13 having a depending sleeve or bushing 14 forms the passage 10 through web 5 and is preferably mounted thereon by providing an externally screw-threaded portion 15 upon the bushing 14 to be screwed tightly into the aperture 11 which is threaded correspondingly to receive the bushing with suitable means for providing a fluid tight joint at this point. Such means may include a shoulder 16 on the bushing which is arranged to tightly abut the margin of the aperture 11. Thus the bushing 14 margins the passage 10 concentrically with the axis of the valve 12. The interior of the bushing 14 may have two or more projections 17 therein for engagement with a tool for manipulating the bushing.

In accordance with this invention, the valve seat 13 is provided with a plurality of annular surfaces successively increasing in angularity to the valve axis with the lowermost surface 18 departing from the passageway 10 formed by the bore of the bushing 14 and joining the lower edge of the surface 19 which in turn is joined at its upper edge to the lower edge of the surface 20 and the upper edge of the surface 20 is terminated by the flat surface 21 lying in a plane at right angles to said axis. The body of the valve seat is extended beyond the outer circumference of the flat surface 21 to form an annular surface 22 departing at a downwardly inclined angle thereto and oppositely disposed to the angular seat portion 20. By this construction a valve seat is provided which may be readily applied to valves during the course of assembly at the factory or may be substituted for those in use on the job they are designed to perform and will cooperate with any standard valve head in accordance with the service in which the valve is employed.

While it is preferable in order to obtain the greatest efficiency to employ a valve head 12 having a plurality of removable dish-shaped face members cooperating with the valve seat, such as disclosed in this applicant's copending application, Serial No. 648,145, filed December 21, 1932, such construction is not necessary as the multifaced seat will cooperate with other standard valve head constructions now in use.

Figure 2:
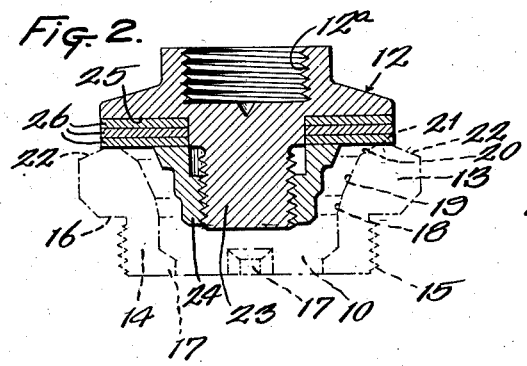
Figure 2 is a detail view illustrating the application of this invention to another type of valve structure in which the valve head is shown in section and the seat in broken lines.
Figure 3:
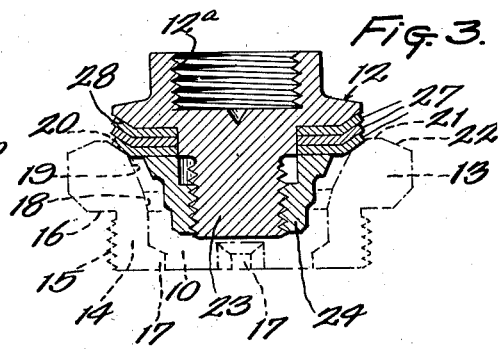
Figures 3, 4 and 5 are views similar to Figure 2 of other types of valve structures.
Figure 4:
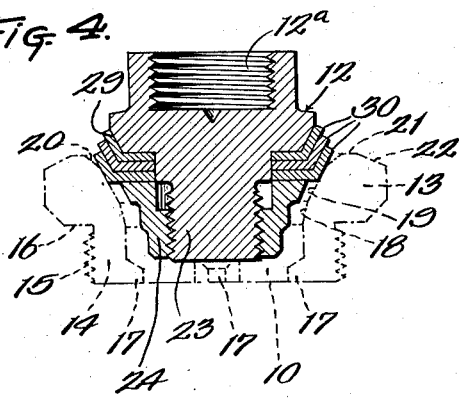
Figure 5:
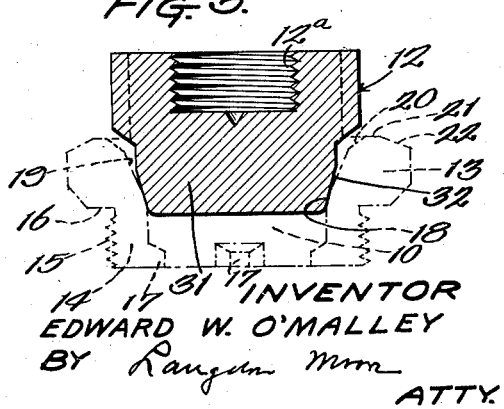

Figure 2 illustrates the application of this improved seat to a check valve or other valve in which the mating surfaces of the head and seat contact each other in a plane at right angles to the axis of the valve and in which the valve head cooperates with the top or flat surface 21 of the seat 13. Figure 3 illustrates the application of the same seat to valves which are now in general use in which the mating surfaces of the head and seat are designed to contact each other at an angle of approximately 32 degrees and in which the valve head cooperates with the angular surface 20, or uppermost angular seat face of the seat 13. Figure 4 illustrates the application of this same improved seat to a valve in which the mating surfaces of the head and seat are designed to contact each other at an angle of approximately 60 degrees and in which the valve head cooperates with the angular surface 19 or intermediate angular seat face of the valve seat 13. Figure 5 illustrates the application of the same seat to the recognized plug type of valve for use where an acid condition exists and in which it is customary to provide ground mating surfaces of approximately an angle of 75 degrees and in which the valve head cooperates with the angular surface 18 or lowermost angular seat face of the valve seat 13.

In Figures 2, 3 and 4, each valve head 12 is shown as being provided with a plurality of removable perforated face plates mounted upon an integral screw-threaded stud 23 depending axially from the valve head 12 held in place by a similarly threaded retaining nut 24. In Figure 2, the bearing surface 25 of the head 12 for the plates 26 is in a plane at right angles to the axis of the valve and the plates 26 are each flat, as shown, and when the valve is closed the entire flat surface 21 of the valve seat 13 will engage the surface of the plate 26 thereabove. In Figure 3, a plurality of disk-shaped removable perforated face plates 27 are mounted in the same manner upon the valve head and in this instance the outer edges 28 of the head 12 are beveled at the same angle as the outer portions of the respective plates 27 and the upper angular surface 20 of the valve seat 13 whereby said surface will mate throughout the same extent with each respective plate upon the removal of the one next below it, as the dimensions of the flat and angular surfaces of each of these plates are the same. In Figure 4, the outer edges 29 of the head 12 are beveled at a greater angle than shown in Figure 3 requiring a progressive increase in the diameter of the flat surface of the respective plates 30 nested thereon and also that the intermediate angular surface 19 of the seat 13 to nest with each succeeding plate be of greater extent, as shown. In Figure 5, the valve head 12 is preferably formed of a metal of substantially the same hardness as the seat 13 and is extended downwardly to form the integral plug 31 beveled at its lower end to form a surface 32 to mate with the lowermost angular surface 18 of the valve seat 13.

This invention also contemplates the provision on the valve seat 13 of the circumferential angular surface or bevel 22 making an approximate angle of 25 degrees to the valve axis for cooperation with the outer edge of the head 12, or the outer inclined surfaces of removable face plates 33, by interposing between the flat surface 25 of a valve head of the type shown in Figure 2, and the face plates 33 nested thereon of a face plate supporting member 34 having a flat surface to engage the flat surface 25 of the valve head 12 and provided about its circumference an annular integral depending portion 35 having an angular surface 36 extending from the lower exterior edge to join the flat surface on that side of the main body at approximately 32 degrees to the valve axis to receive and support the nested plates 33 in an inverted position from that shown in Figure 3. In this type the diameter of the face plates 33 progressively decrease as they are nested on the supporting member 34 and are preferably of a metal of substantially the same hardness as the valve seat member 13 so that, on account of the different angular relation between the valve seating surface 22 and the angular plate supporting member surface 35, a hard edge at the circumference of a face plate 33 will cooperate with the seat face 22 which point of contact will be different with the respective face plates.

This latter type of mating valve head and valve seat is of particular advantage for use in connection with air pumps, blower, steam heat and throttle valves and valves used in any service wherein the mating parts may become cut or scored, usually termed wire drawn by the trade, by the fluid rushing with great velocity over said parts when the valve is slightly opened.

From the above disclosure, it is readily seen that a single valve seat constructed in accordance with this invention may be installed or applied to a valve casing and will cooperate to mate with a valve head of preferred form, with or without removable face plates. Such a valve seat may therefor be termed a universal as well as a multifaced seat on account of its many uses.

What I claim is:

In a valve having an annular valve seat for cooperating with a reciprocable valve head, said valve seat having a seat face perpendicular to the axis of the bore of the seat and a seat face disposed at an angle thereto at each side of the valve seat and other seat faces within the bore disposed at angles different from the angles of the other seat faces for engagement with a valve head having a surface for mating with one of said seat faces.

EDWARD W. O'MALLEY.